US011408666B2

(12) United States Patent
Yao et al.

(10) Patent No.: US 11,408,666 B2
(45) Date of Patent: Aug. 9, 2022

(54) REFRIGERATION APPLIANCE CABINET THERMAL INSULATION CONTAINER AND REFRIGERATION APPLIANCE

(71) Applicants: HEFEI HUALING CO., LTD., Anhui (CN); HEFEI MIDEA REFRIGERATOR CO., LTD., Anhui (CN); MIDEA GROUP CO., LTD., Guangdong (CN)

(72) Inventors: Jun Yao, Anhui (CN); Mingbo Jiang, Anhui (CN)

(73) Assignees: HEFEI HUALING CO., LTD., Anhui (CN); HEFEI MIDEA REFRIGERATOR CO., LTD., Anhui (CN); MIDEA GROUP CO., LTD., Guangdong (CN)

( * ) Notice: Subject to any disclaimer, the term of this patent is extended or adjusted under 35 U.S.C. 154(b) by 255 days.

(21) Appl. No.: 16/610,845

(22) PCT Filed: Aug. 4, 2017

(86) PCT No.: PCT/CN2017/096036
§ 371 (c)(1),
(2) Date: Apr. 13, 2020

(87) PCT Pub. No.: WO2018/201634
PCT Pub. Date: Nov. 8, 2018

(65) Prior Publication Data
US 2020/0248954 A1    Aug. 6, 2020

(30) Foreign Application Priority Data
May 5, 2017 (CN) .......................... 201710317427.8

(51) Int. Cl.
*F25D 23/06* (2006.01)
*F16B 5/00* (2006.01)

(52) U.S. Cl.
CPC .......... *F25D 23/065* (2013.01); *F16B 5/0084* (2013.01); *F25D 23/063* (2013.01); *F25D 2201/126* (2013.01)

(58) Field of Classification Search
CPC ...... F25D 23/06; F25D 23/062; F25D 23/063; F25D 23/065; F25D 2323/06; F16B 5/0084; F16B 5/0092; E04B 1/6183
See application file for complete search history.

(56) References Cited

U.S. PATENT DOCUMENTS 2,581,816 A * 1/1952 Schlueter .............. E04B 1/6183
52/582.2
2,741,341 A * 4/1956 Anderson ............. F25D 23/063
312/406.2

(Continued)

FOREIGN PATENT DOCUMENTS

CN          2296985 Y      11/1998
CN        201610596 U      10/2010
(Continued)

*Primary Examiner* — Andrew M Roersma
(74) *Attorney, Agent, or Firm* — Seed IP Law Group LLP (57) ABSTRACT

A thermal insulation container (100) for a cabinet of a refrigeration apparatus includes a plurality of foamed boards (10) and a connecting mechanism (20). At least two adjacent foamed boards (10) are connected by the connecting mechanism (20), The connecting mechanism (20) includes a first connecting member (210) and a second connecting member (220). A connecting hook (211) is rotatably provided on the first connecting member (210), and a fixing post (221) is rotatably provided on the second connecting member (220). An elastic protrusion (216) is provided on the first connecting member (210) or the second connecting member (220), and the elastic protrusion (216) is pressed by the connecting hook (211) during rotation. In a connection position, the connecting hook (211) is rotated to cooperate with the fixing post (221) and to be located between the fixing post (221)

(Continued)

and the elastic protrusion (216). In a separation position, the connecting hook (211) is separated from the fixing post (221).

18 Claims, 5 Drawing Sheets

(56) References Cited

U.S. PATENT DOCUMENTS

| | | | | |
|---|---|---|---|---|
| 2,842,814 | A | * | 7/1958 | Lindgren .............. E04B 1/6141 160/113 |
| 3,280,522 | A | | 10/1966 | Palfey et al. |
| 3,472,545 | A | * | 10/1969 | Berkowitz ............ E04B 1/6183 292/111 |
| 3,661,410 | A | * | 5/1972 | Larson ................ E05B 65/0817 52/127.9 |
| 4,045,927 | A | | 9/1977 | Diaz |
| 4,417,430 | A | | 11/1983 | Loikitz |
| 4,435,939 | A | * | 3/1984 | Hird ........................ E04C 2/292 52/127.7 |
| 4,507,010 | A | * | 3/1985 | Fujiya .................. E04B 1/6183 292/98 |
| 4,512,122 | A | | 4/1985 | Berkowitz |
| 5,424,118 | A | * | 6/1995 | McLaughlin ......... E04B 1/6183 428/314.8 |
| 6,079,754 | A | * | 6/2000 | Alexy ................... E04B 1/6183 292/101 |
| 9,170,044 | B2 | | 10/2015 | Hoffmann |
| 9,863,143 | B2 | | 1/2018 | Finkelstein et al. |

FOREIGN PATENT DOCUMENTS

| | | | | |
|---|---|---|---|---|
| CN | 201627413 U | | 11/2010 | |
| CN | 102645066 A | | 8/2012 | |
| CN | 104422230 A | | 3/2015 | |
| CN | 106595209 A | | 4/2017 | |
| GB | 1573648 A | * | 8/1980 | ........... F25D 23/063 |
| JP | 53-93946 U | | 7/1978 | |
| JP | 55-55314 U | | 4/1980 | |
| JP | 56-100946 A | | 8/1981 | |
| JP | 62-94382 U | | 6/1987 | |
| JP | H0814486 A | | 1/1996 | |
| JP | H0914826 A | | 1/1997 | |
| JP | 2009-250414 A | | 10/2009 | |
| JP | 2011-64242 A | | 3/2011 | |
| JP | 2016035157 A | | 3/2016 | |

* cited by examiner

REFRIGERATION APPLIANCE CABINET THERMAL INSULATION CONTAINER AND REFRIGERATION APPLIANCE

FIELD

The present disclosure relates to a technical field of household appliances, and more particularly to a thermal insulation container for a cabinet of a refrigeration apparatus and a refrigeration apparatus having the same.

BACKGROUND

In the production process of existing refrigerators, cabinets and doors are generally produced separately. Since cabinets of the refrigerators need to be designed with space for thermal insulation partition plates, it is required to design and manufacture a large manufacturing apparatus and mold to produce cabinets of the refrigerators; the mold is easily damaged during the production process, and the replacement of the mold requires a lot of manpower and financial resources. After the processing, a lot of space is occupied during transportation of semi-finished refrigerators, causing a great waste of resources.

SUMMARY

The present disclosure aims to solve at least one of the technical problems existing in the related art. Accordingly, the present disclosure proposes a thermal insulation container for a cabinet of a refrigeration apparatus, which facilitates assembly of thermal insulation boards of refrigerators and transportation of refrigerator products, and saves production and transportation costs.

The present disclosure further proposes a refrigeration apparatus having the above thermal insulation container.

The thermal insulation container according to embodiments of the present disclosure includes a plurality of foamed boards, at least two adjacent foamed boards being connected by a connecting mechanism. The connecting mechanism includes: a first connecting member and a second connecting member which are connected with two foamed boards respectively; a connecting hook, provided on the first connecting member and being rotatable between a connection position and a separation position; a fixing post and an elastic protrusion, the fixing post being provided on the second connecting member, and the elastic protrusion being provided on the first connecting member or the second connecting member and being pressed by the connecting hook during rotation. In the connection position, the connecting hook is rotated to cooperate with the fixing post and to be located between the fixing post and the elastic protrusion, and in the separation position, the connecting hook is separated from the fixing post.

In the thermal insulation container according to embodiments of the present disclosure, since the connecting mechanism is employed to connect the plurality of foamed boards together to constitute the thermal insulation container for the cabinet of the refrigeration apparatus, the cabinet of the refrigeration apparatus can be assembled and transported conveniently, thereby saving costs. By providing the connecting members of the connecting mechanism with the elastic protrusion and the connecting hook, rotating the connecting hook in different directions can realize the cooperation and separation of the connecting members. Thus, the structure cooperation is stable, the fixation and connection between adjacent thermal insulation boards becomes tight, and the occurrence of cold energy leakage between the adjacent thermal insulation boards is reduced.

In some embodiments of the present disclosure, the first connecting member and the second connecting member adhere to corresponding foamed boards.

In some embodiments of the present disclosure, the first connecting member and the second connecting member are respectively foamed and connected in corresponding foamed boards.

In some embodiments of the present disclosure, one of two adjacent foamed boards is provided with a rib, and the other foamed board of the two adjacent foamed boards is provided with an insertion groove fitted with the rib.

In some embodiments of the present disclosure, one of the first connecting member and the second connecting member is arranged in one foamed board and is flush with the rib, while the other one thereof is arranged in the other foamed board and is flush with a bottom wall of the insertion groove.

In some embodiments of the present disclosure, the first connecting member is provided with a receiving groove, and in the separation position, the connecting hook is rotated to be received in the receiving groove.

In some embodiments of the present disclosure, the first connecting member includes a main body and a cover body, the main body is provided with a groove with two open sides, and the cover body is provided on the main body to close a side opening of the groove to define the receiving groove.

In some embodiments of the present disclosure, the receiving groove is provided with a fitting hole in a bottom wall of the receiving groove, and an end of the connecting hook is provided with a fitting post rotatably filled with the fitting hole; the connecting mechanism further includes a limiting member provided to the first connecting member and abutting against the connecting hook to position the fitting post in the fitting hole.

In some embodiments of the present disclosure, the second connecting member is provided with a cooperation space therein, the fixing post is disposed in the cooperation space, and in the separation position, the connecting hook is rotated to the outside of the cooperation space.

The refrigeration apparatus includes the thermal insulation container according to the above embodiments of the present disclosure.

For the refrigeration apparatus according to embodiments of the present disclosure, by providing the above thermal insulation container, the connecting mechanism is employed to connect the plurality of foamed boards together to constitute the thermal insulation container for the cabinet of the refrigeration apparatus, the cabinet of the refrigeration apparatus can be assembled and transported conveniently, thereby saving costs; by providing the connecting members of the connecting mechanism with the elastic protrusion and the connecting hook, rotating the connecting hook in different directions can realize the cooperation and separation of the connecting members. Thus, the structure cooperation is stable, the fixation and connection between adjacent thermal insulation boards becomes tight, and the occurrence of the cold energy leakage between the adjacent thermal insulation boards is reduced.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference the accompanying drawings, in which.

REFERENCE NUMERALS thermal insulation container 100,
foamed board 10, rib 110, insertion groove 120,
connecting mechanism 20,
first connecting member 210, connecting hook 211, fitting post 2111, receiving groove 212, fitting hole 2121, main body 213, groove 2131, cover body 214, limiting member 215, elastic protrusion 216,
second connecting member 20, fixing post 221.

DETAILED DESCRIPTION

Embodiments of the present disclosure will be described in detail below, and examples of the embodiments will be illustrated in the accompanying drawings, wherein the same or similar elements and the elements having same or similar functions are denoted by like reference numerals throughout the descriptions. The embodiments described with reference to the drawings are exemplary and only used to understand the present disclosure, and shall not be construed to limit the present disclosure.

In the description, it is to be understood that terms such as "upper," "lower," "front," "rear," "top," "bottom," "inner," "outer," "clockwise," and "counterclockwise" should be construed to refer to the orientation as then described or as shown in the drawings under discussion. These relative terms are for convenience of description and do not indicate or imply that the device or element referred to must have a particular orientation or be constructed and operated in a particular orientation. The terms shall not be construed to limit the present disclosure. In addition, the features defined with "first" and "second" may comprise one or more this feature. In the description of the present disclosure, the term "a plurality of" means two or more than two, unless specified otherwise.

In the description of the present disclosure, it should be understood that, unless specified or limited otherwise, the terms "mounted," "connected," and "coupled" and variations thereof are used broadly, and may be, for example, fixed connections, detachable connections, or integral connections; may also be mechanical or electrical connections; may also be direct connections or indirect connections via intervening structures may also be inner communications of two elements, which can be understood by those skilled in the art according to specific situations.

A thermal insulation container 100 for a cabinet of a refrigeration apparatus according to embodiments of the present disclosure will be described in detail with reference to FIGS. 1 to 9, The thermal insulation container 100 is composed of a plurality of foamed boards 10.

As illustrated in FIGS. 1 to 9, the thermal insulation container 100 for the cabinet of the refrigeration apparatus according to embodiments of the present disclosure includes a plurality of foamed boards 10, and at least two foamed boards 10 are connected by a connecting mechanism 20. The connecting mechanism 20 includes a first connecting member 210, a second connecting member 220, a connecting hook 211, a fixing post 221, and an elastic protrusion 216. The first connecting member 210 and the second connecting member 220 are connected with two foamed boards 10 respectively. It could be understood that the connecting mechanism 2C) can control cooperation and separation of the first connecting member 210 and the second connecting member 220 to achieve control over the connection and separation of two adjacent foamed boards 10.

The connecting hook 211 is provided on the first connecting member 210 and is rotatable between a connection position and a separation position. Specifically, the connecting hook 211 is rotatably provided on the first connecting member 210, and the connecting hook 211 exhibits the connection position and the separation position. When adjacent foamed boards 10 are spliced, the connecting hook 211 can be controlled by tools to rotate in different directions to realize the cooperation and separation of the first connecting member 210 and the second connecting member 220, thereby achieving the splicing and separation of the two foamed boards 10.

The fixing post 221 is provided on the second connecting member 220, the elastic protrusion 216 is provided on the first connecting member 210 or the second connecting member 220, and the connecting hook 211 presses the elastic protrusion 216 during the rotation. In the connection position, the connecting hook 211 is rotated to cooperate with the fixing post 221, and a position where they cooperate with each other is located between the fixing post 221 and the elastic protrusion 216. In the separation position, the connecting hook 211 is separated from the fixing post 221. It could be understood that the position of the elastic protrusion 216 is not fixed, that is, the elastic protrusion 216 can be provided on the first connecting member 210 or on the second connecting member 220, as long as the cooperation between the connecting hook 211 and the fixing post 221 is firm. For instance, in a specific example, when the connecting hook 211 is in the separation position, the connecting hook 211 can be rotated clockwise, the connecting hook 211 presses the elastic protrusion 216 during the rotation, and the connecting hook 211 is rotated over the elastic protrusion 216 to a position where it cooperates with the fixing post 221. In the cooperation position, the position of the connecting hook 211 is defined between the fixing post 221 and the elastic protrusion 216, thereby guaranteeing stable cooperation and ensuring that the first connecting member 210 and the second connecting member 220 are stably connected as one piece.

The thermal insulation container 100 for the cabinet of the refrigeration apparatus according to embodiments of the present disclosure is formed by connecting the plurality of foamed boards 10 together through the connecting mechanism 20, which facilitates assembly and transportation of the cabinet of the refrigeration apparatus and saves costs. The connecting members of the connecting mechanism 20 are provided with the elastic protrusion 216 and the connecting hook 211, and rotating the connecting hook 211 in different directions can realize the cooperation and separation of the connecting members, Thus, the structure cooperation is stable, the fixation and connection between adjacent thermal insulation boards of the refrigeration apparatus becomes tight, and the occurrence of cold energy leakage between the adjacent thermal insulation boards is reduced.

Figure 5:
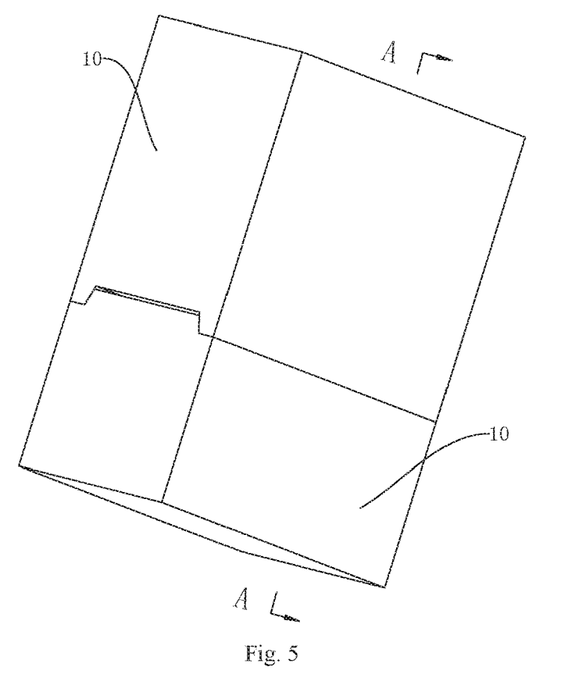
FIG. 5 is a schematic view showing cooperation of adjacent foamed hoards of a thermal insulation container for a cabinet of a refrigeration apparatus according to embodiments of the present disclosure.
Figure 6:
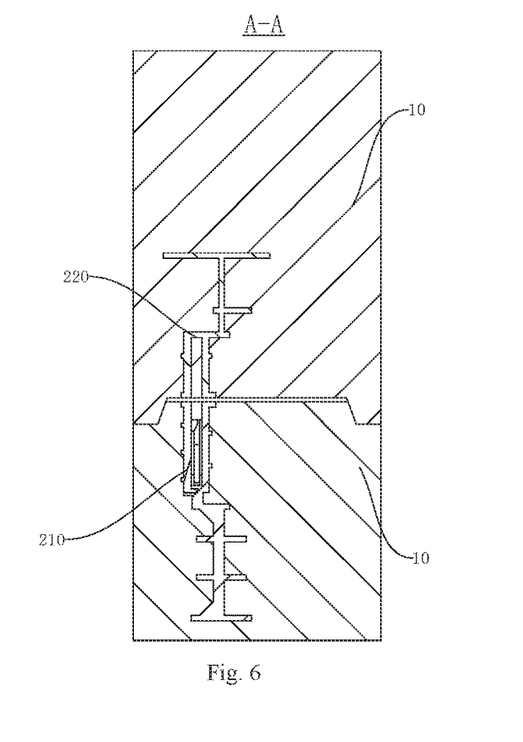
FIG. 6 is a sectional view taken along a direction A-A in FIG. 5.

In some embodiments of the present disclosure, the first connecting member 210 and the second connecting member 220 adhere to corresponding foamed boards 10. For example, as illustrated in FIGS. 5 and 6, when adjacent foamed boards 10 are spliced, the first connecting member 210 and the second connecting member 220 are respectively fixed on two foamed boards 10 by adhesion, and the splicing of two adjacent foamed boards 10 is realized by controlling the cooperation of the connecting hook 211 and the fixing post 221 of the connecting mechanism 20 through tools.

In some other embodiments of the present disclosure, the first connecting member 210 and the second connecting member 220 are respectively foamed and connected in the corresponding foamed boards 10. In such a way, when two foamed boards 10 are connected, the connecting mechanism 20 can be hidden in the foamed boards 10, improving the overall aesthetics.

Figures 7, 8:
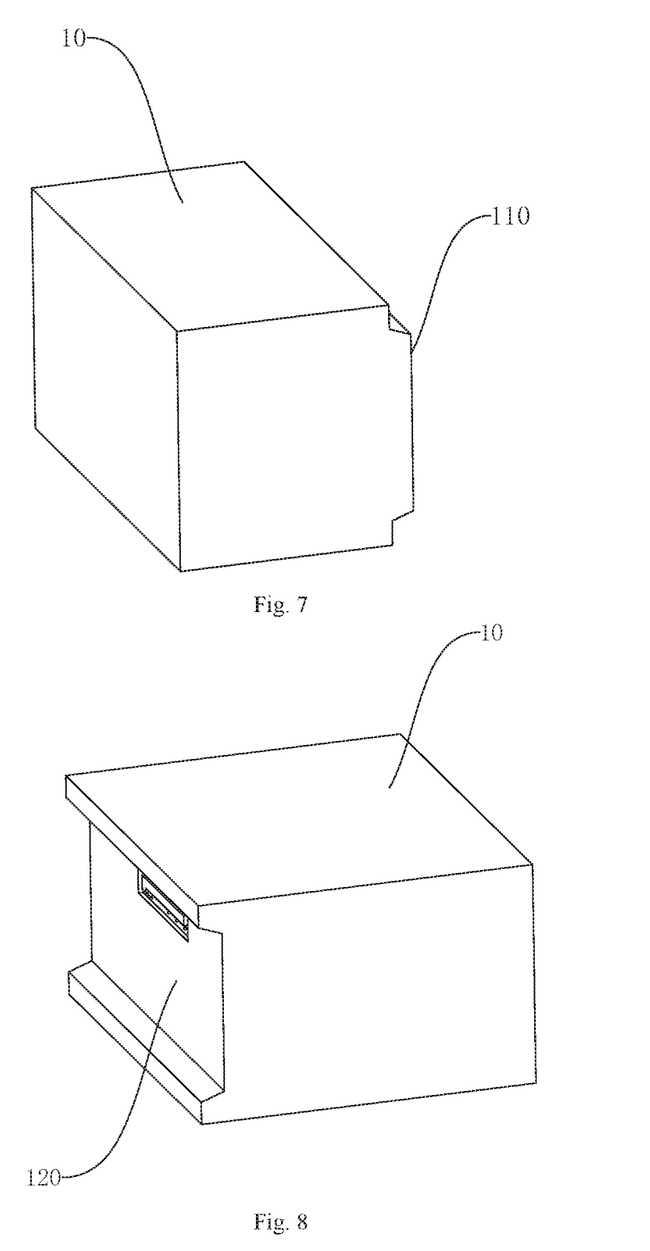
FIG. 7 is a schematic view of a foamed board of a thermal insulation container for a cabinet of a refrigeration apparatus according to embodiments of the present disclosure, in which the foamed board is provided with a rib.
FIG. 8 is a schematic view of a foamed board of a thermal insulation container for a cabinet of a refrigeration apparatus according to embodiments of the present disclosure, in which the foamed board is provided with an insertion groove.
Figure 9:
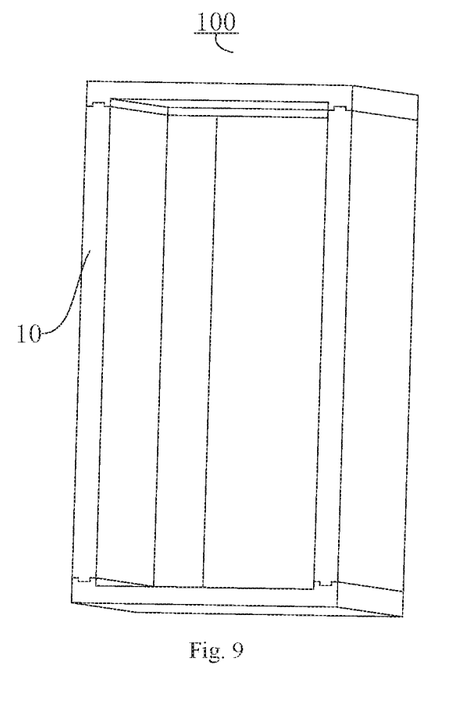
FIG. 9 is a schematic view showing an overall structure of a thermal insulation container for a cabinet of a refrigeration apparatus after the assembly according to embodiments of the present disclosure.

As illustrated in FIGS. 7-8, in some embodiments of the present disclosure, one of two adjacent foamed boards 10 is provided with a rib 110, and the other foamed board 10 thereof is provided with an insertion groove 120 fitted with the rib 110. It could be understood that the foamed board 10 provided with the rib 110 and the foamed board 10 provided with the insertion groove 120 can be paired. When the two foamed boards 10 are spliced, one foamed board 10 provided with the rib 110 and one foamed board 10 provided with the insertion groove 120 are selected, and the two foamed boards 10 are spliced together by the fitting between the rib 110 and the insertion groove 120.

By providing the rib 110 and the insertion groove 120, a contact area between the two adjacent foamed boards 10 can be enlarged, and the wiring can be meandering, thereby further reducing the cold energy leakage phenomenon.

Further, as illustrated in FIGS. 5 to 8, one of the first connecting member 210 and the second connecting member 220 is arranged in one foamed board 10 and is flush with the rib 110, while the other one thereof is arranged in another foamed board 10 and is flush with a bottom wall of the insertion groove 120. Specifically, the formed boards 10 provided with the rib 110 and the insertion groove 120 can have installation space therein for the connecting mechanism 20. When the connecting member is installed in the foamed board 10 with the rib 110, an outer end of the connecting member should be flush with an outer surface of the rib 110; when the connecting member is installed in the foamed board 10 with the insertion groove 120, the outer end of the connecting member should be flush with the bottom wall of the insertion groove 120. In the process of splicing two foamed boards 10, the two foamed boards 10 can be closely spliced together only after the rib 110 and the insertion groove 120 are fitted, thereby avoiding the cold energy leakage phenomenon. For example, as illustrated in FIG. 6, the first connecting member 210 is installed in the foamed board 10 with the rib 110, the second connecting member 220 is installed in the foamed board 10 with the insertion groove 120, and the first connecting member 210 is connected with and cooperates with the second connecting member 220, so as to splice the two foamed boards 10 together.

Figure 1:
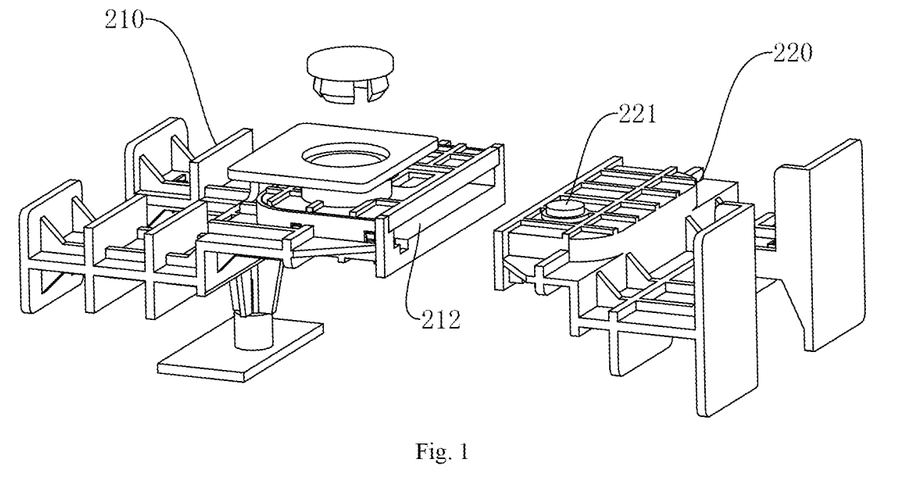
FIG. 1 is a disassembled view of a connecting mechanism of a thermal insulation container for a cabinet of a refrigeration apparatus according to embodiments of the present disclosure.
Figure 2:
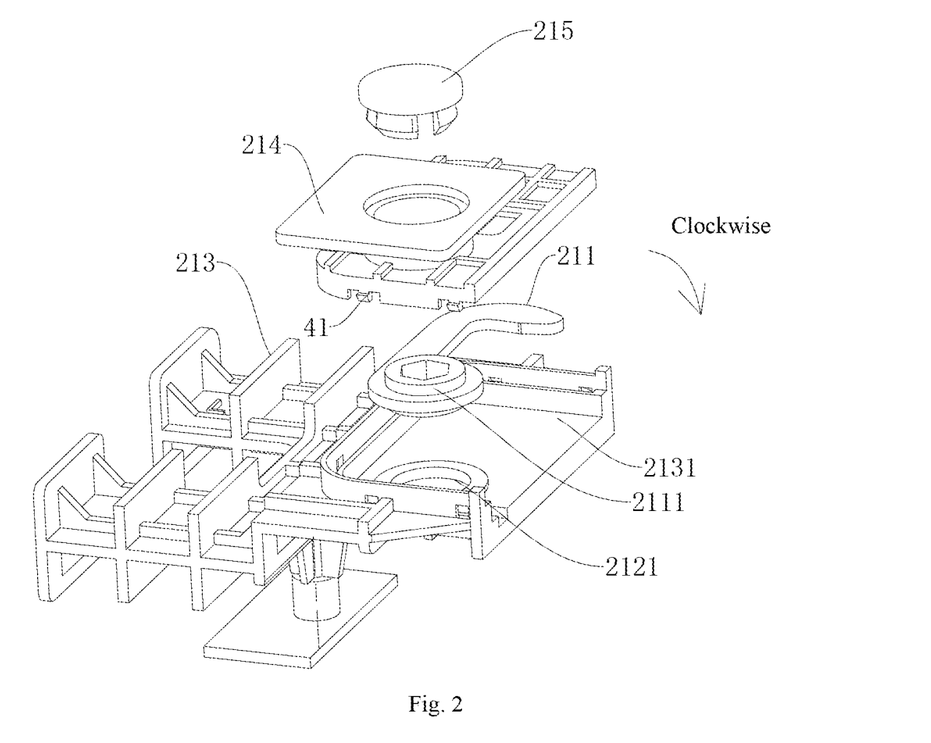
FIG. 2 is an exploded view of a first connecting member according to embodiments of the present disclosure.

As illustrated in FIGS. 1-2, in some embodiments of the present disclosure, the first connecting member 210 is provided with a receiving groove 212, and in the separation position, the connecting hook 211 is rotated to be received in the receiving groove 212. It could be understood that the receiving groove 212 defines an installation position for the connecting hook 211, and in the cooperating state, the connecting hook 211 is able to perform clockwise and counterclockwise rotation. By providing the receiving groove 212 to receive the connecting hook 211, damage of the connecting hook 211 when the connecting mechanism 20 is subjected to impact can be reduced, and the operational reliability of the connecting mechanism 20 can be enhanced.

As illustrated in FIG. 2, in some examples of the present disclosure, the first connecting member 210 includes a main body 213 and a cover body 214. The main body 213 is provided with a groove 2131 with two open sides, and the cover body 214 is provided on the main body 213 to close a side opening of the groove 2131 to define the receiving groove 212. Specifically, the groove 2131 defines an installation and cooperation space for the connecting hook 211 and the receiving groove 212. After the main body 213 and the cover body 214 are fitted, only one side of the groove 2131 is open, and the connecting hook 211 cooperates with or separates from the fixing post 221 through the open side. The arrangement of the groove 2131 satisfies normal working of the connecting hook 211 and makes the appearance of the connecting mechanism 20 more aesthetic.

Further, as illustrated in FIG. 2, a bottom wall of the receiving groove 212 is provided with a fitting hole 2121, and an end of the connecting hook 211 is provided with a fitting post 2111 rotatably fitted with the fitting hole 2121. The fitting post 2111 and the fitting hole 2121 adopt an interference fit, and the fitting post 2111 can be rotated in the fitting hole 2121 without obstruction, so as to enable the connecting hook 211 to complete the connection and separation of the two connecting members. The connecting mechanism 20 further includes a limiting member 215 provided to the first connecting member 210 and abutting against the connecting hook 211 to position the fitting post 2111 in the fitting hole 2121. That is, the limiting member 215 defines movement of the connecting hook 211 in an up-and-down direction. When the first connecting member 210 cooperates with the second connecting member 220, the limiting member 215 positions the fitting post 2111 in the fitting hole 2121, so as to ensure the firm cooperation between the connecting hook 211 and the fixing post 221. When the first connecting member 210 is separated from the second connecting member 220, the limiting member 215 is pulled out and the connecting hook 211 can be rotated freely in the fitting hole 2121, so as to complete the separation of the connecting hook 211 from the fixing post 221.

Specifically, as illustrated in FIG. 2, the fitting post 2111 is provided with a non-circular hole (e.g., a hexagonal hole), and the non-circular hole is arranged corresponding to the fitting hole 2121, When the connecting hook 211 needs to be rotated, a tool (e.g., a hexagon wrench) can be inserted into the non-circular hole and rotated, such that the connecting hook 211 is rotated clockwise or counterclockwise.

When the first connecting member 210 is formed in the foamed board 10, the foamed board 10 can be provided with a clearance hole corresponding to the fitting hole 2121, to facilitate the use of the tool to rotate the connecting hook 211.

Figure 3:
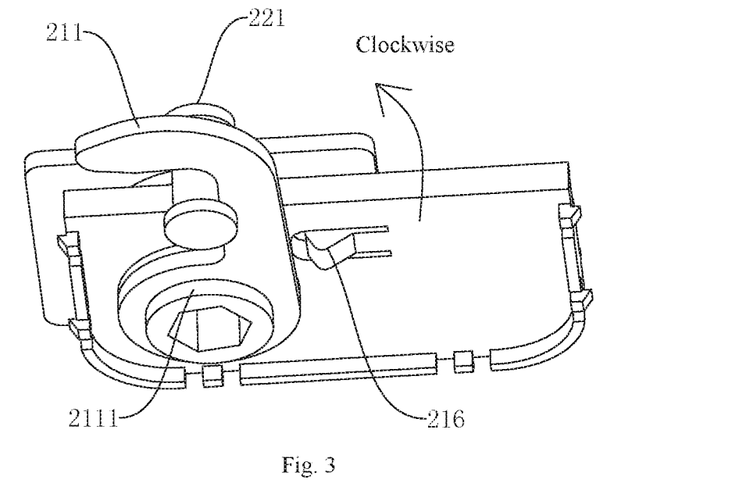
FIG. 3 is a schematic view showing cooperation of a connecting hook and a fixing post according to embodiments of the present disclosure.
Figure 4:
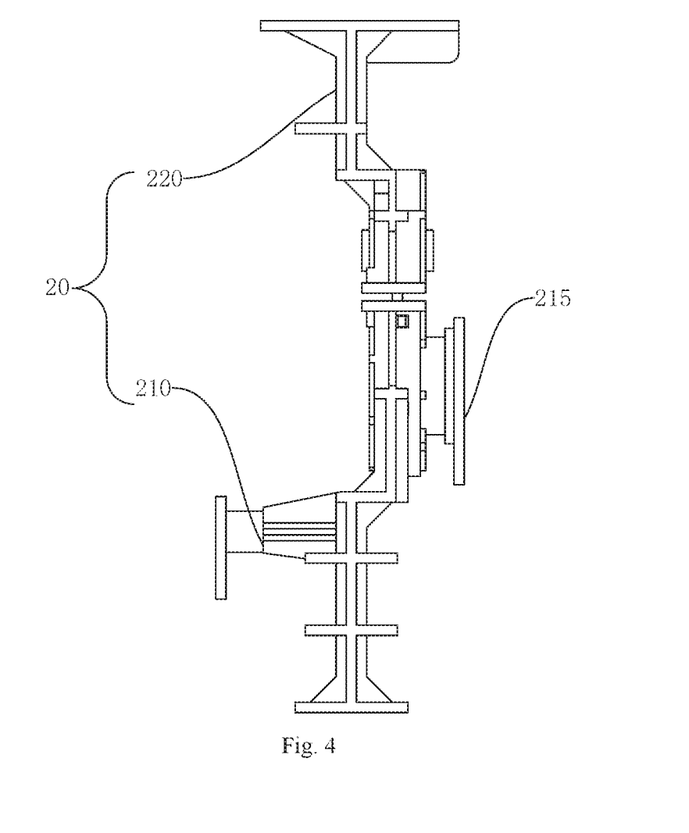
FIG. 4 is a schematic view showing cooperation of a first connecting member and a second connecting member according to embodiments of the present disclosure.

As illustrated in FIG. 3, in some embodiments of the present disclosure, the second connecting member 220 is provided with a cooperation space therein, and the fixing post 221 is disposed in the cooperation space. In the separation position, the connecting hook 211 is rotated to the outside of the cooperation space. Specifically, the second connecting member 220 defines the cooperation space therein, and the cooperation position of the connecting hook 211 and the fixing post 221 is defined between the fixing post 221 and the elastic protrusion 216. In the connection position, the connecting hook 211 is rotated clockwise to the cooperation position for cooperating with the fixing post 221, to realize the connection between the first connecting member 210 and the second connecting member 220. In the separation position, the connecting hook 211 is rotated counterclockwise out of the cooperation position with the fixing post 221, to realize the separation of the first connecting member 210 and the second connecting member 220.

The refrigeration apparatus according to embodiments of the present disclosure includes the above thermal insulation container 100 for the cabinet of the refrigeration apparatus in the above embodiments of the present disclosure.

For the refrigeration apparatus according to embodiments of the present disclosure, by providing the above thermal insulation container 100 for the cabinet of the refrigeration apparatus, the connecting mechanism 20 is employed to connect the plurality of foamed boards 10 together to constitute the thermal insulation container for the cabinet of the refrigeration apparatus, the cabinet of the refrigeration apparatus can be assembled and transported conveniently, thereby saving costs; by providing the connecting members of the connecting mechanism 20 with the elastic protrusion 216 and the connecting hook 211, rotating the connecting hook 211 in different directions can realize the cooperation and separation of the connecting members. Thus, the structure cooperation is stable, the fixation and connection between adjacent thermal insulation boards becomes tight, and the occurrence of the cold energy leakage between the adjacent thermal insulation boards is reduced.

Reference throughout this specification to "an embodiment," "some embodiments," "an exemplary embodiment", "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments have been shown and described, it would be appreciated by those skilled in the art that changes, modifications, alternatives, and variations can be made in the embodiments without departing from principles and purposes of the present disclosure. The scope of the present disclosure is defined by claims and the like.

What is claimed is:

1. A thermal insulation container for a cabinet of a refrigeration apparatus, comprising a plurality of foamed boards, at least two adjacent said foamed boards of the plurality of formed boards being connected by a connecting mechanism, and the connecting mechanism including:
   a first connecting member and a second connecting member, connected with two foamed boards of the at least two adjacent said foamed boards, respectively;
   a connecting hook, provided on the first connecting member and being rotatable between a connection position and a separation position;
   a fixing post provided on the second connecting member; and
   an elastic protrusion provided on one of the first connecting member or the second connecting member, the elastic protrusion structured to be pressed by the connecting hook during rotation between the separation position and the connection position, in the connection position, the connecting hook being rotated to cooperate with the fixing post and to be located between the fixing post and the elastic protrusion without engaging the elastic protrusion, and in the separation position, the connecting hook being separated from the fixing post.

2. The thermal insulation container according to claim 1, wherein the first connecting member and the second connecting member each adhere to corresponding one of the at least two adjacent said foamed boards, respectively.

3. The thermal insulation container according to claim 1, wherein the first connecting member and the second connecting member are each foamed and coupled to corresponding one of the at least two adjacent said foamed boards, respectively.

4. The thermal insulation container according to claim 1, wherein a first foamed board of the at least two adjacent said foamed boards is provided with a rib, and a second foamed board of the two foamed boards is provided with an insertion groove structured to fit with the rib.

5. The thermal insulation container according to claim 4, wherein one of the first connecting member and the second connecting member is arranged in the first foamed board and is flush with the rib, while another one of the first connecting member and the second connecting member is arranged in the second foamed board and is flush with a bottom wall of the insertion groove.

6. The thermal insulation container according to claim 1, wherein the first connecting member is provided with a receiving groove, and in the separation position, the connecting hook is received in the receiving groove.

7. The thermal insulation container according to claim 6, wherein the first connecting member comprises a main body and a cover body, the main body is provided with a groove with two open sides, and the cover body is provided on the main body to close a side opening of the groove to define the receiving groove.

8. The thermal insulation container according to claim 6, wherein the receiving groove is provided with a fitting hole in a bottom wall of the receiving groove, and an end of the connecting hook is provided with a fitting post structured to rotatably fit with the fitting hole; and the connecting mechanism further comprises a limiting member provided to the first connecting member and abutting against the connecting hook to position the fitting post in the fitting hole.

9. The thermal insulation container according to claim 1, wherein the second connecting member is provided with a cooperation space therein, the fixing post is disposed in the cooperation space, and in the separation position, the connecting hook is outside of the cooperation space.

10. A refrigeration apparatus, comprising:
a refrigerating system; and
a body in fluid communication with the refrigerating system, the body including a thermal insulation container including a plurality of foamed boards connected by one or more connecting mechanisms, a connecting mechanism of the one or more connecting mechanisms including:
a first connecting member and a second connecting member, connected with two foamed boards of the plurality of foamed boards, respectively;
a connecting hook, provided on the first connecting member and being rotatable between a connection position and a separation position;
a fixing post provided on the second connecting member; and
an elastic protrusion provided on one of the first connecting member or the second connecting member, the elastic protrusion structured to be pressed by the connecting hook during rotation between the separation position and the connection position, in the connection position, the connecting hook being rotated to cooperate with the fixing post and to be located between the fixing post and the elastic protrusion without engaging the elastic protrusion, and in the separation position, the connecting hook being separated from the fixing post.

11. The refrigeration apparatus according to claim 10, wherein the first connecting member and the second connecting member each adhere to a corresponding one of the two foamed boards, respectively.

12. The refrigeration apparatus according to claim 10, wherein the first connecting member and the second connecting member are each foamed and integrated to a corresponding one of the two foamed boards, respectively.

13. The refrigeration apparatus according to claim 10, wherein a first foamed board of the two foamed boards is provided with a rib, and a second foamed board of the two foamed boards is provided with an insertion groove structured to fit with the rib.

14. The refrigeration apparatus according to claim 13, wherein one of the first connecting member and the second connecting member is arranged in the first foamed board and is flush with the rib, while another one of the first connecting member and the second connecting member is arranged in the second foamed board and is flush with a bottom wall of the insertion groove.

15. The refrigeration apparatus according to claim 10, wherein the first connecting member is provided with a receiving groove, and in the separation position, the connecting hook is received in the receiving groove.

16. The refrigeration apparatus according to claim 15, wherein the first connecting member comprises a main body and a cover body, the main body is provided with a groove with two open sides, and the cover body is provided on the main body to cover a side opening of the groove.

17. The refrigeration apparatus according to claim 15, wherein the receiving groove is provided with a fitting hole in a bottom wall of the receiving groove, and an end of the connecting hook is provided with a fitting post structured to rotatably fit with the fitting hole; and the connecting mechanism further comprises a limiting member provided to the first connecting member and abutting against the connecting hook to position the fitting post in the fitting hole.

18. The refrigeration apparatus according to claim 10, wherein the second connecting member is provided with a cooperation space therein, the fixing post is disposed in the cooperation space, and in the separation position, the connecting hook is outside of the cooperation space.

* * * * *